Figure 1:
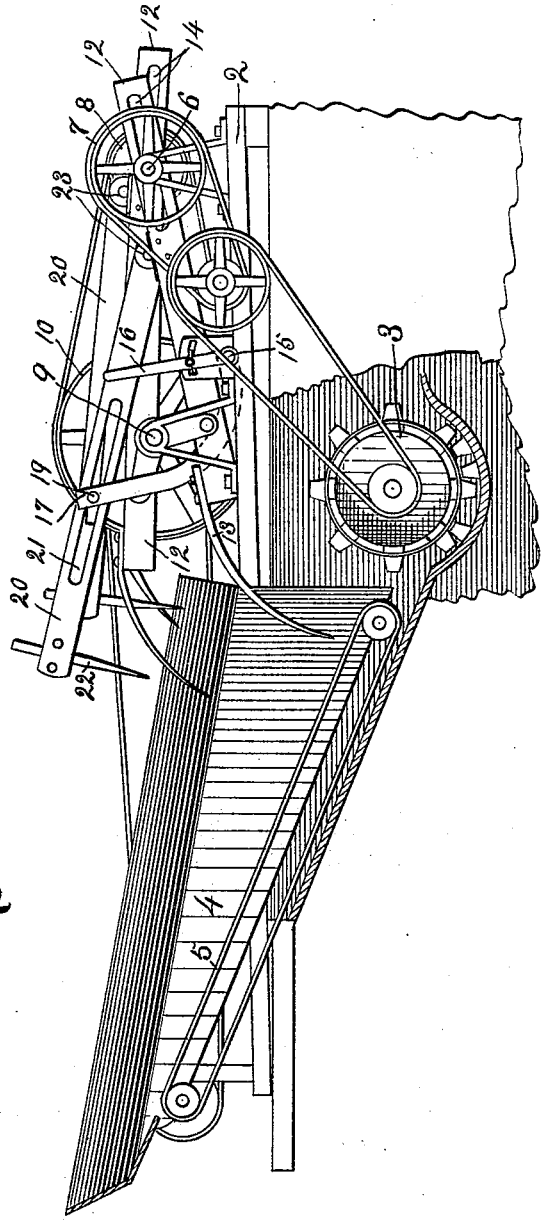

(No Model.) 2 Sheets—Sheet 1.

M. T. REEVES & J. N. KAILOR.
CLOVER HULLER FEEDER.

No. 521,347. Patented June 12, 1894.

Witnesses
V. M. Hood.
W. E. Duthie

Inventors,
Marshal T. Reeves,
John N. Kailor.
By Attorney
H. P. Hood

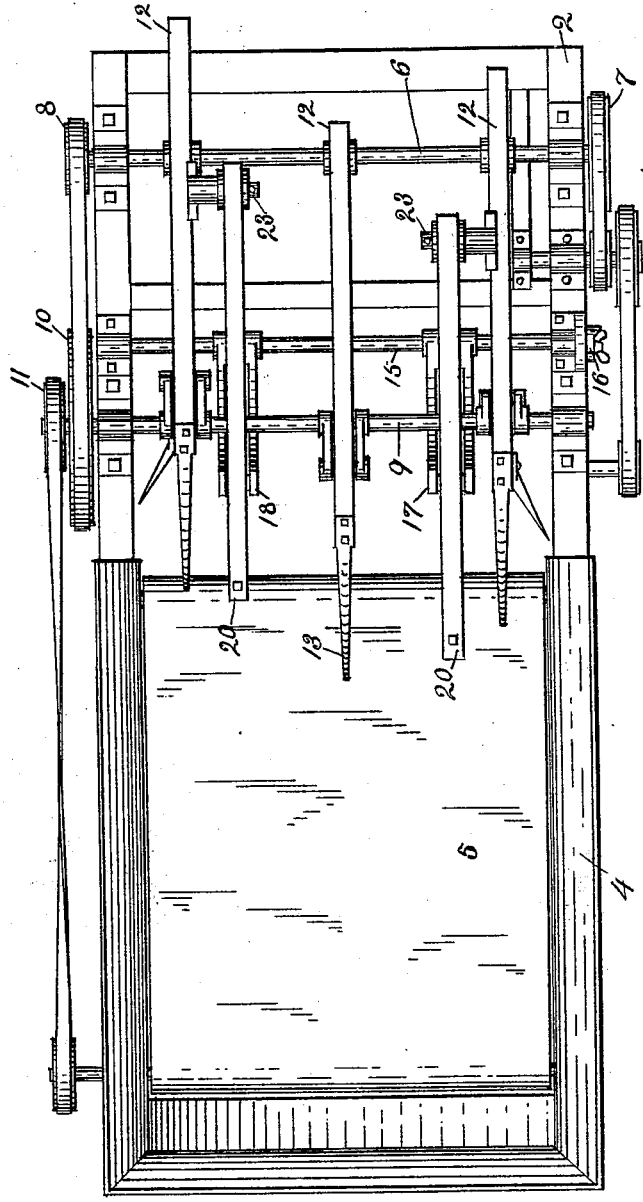

UNITED STATES PATENT OFFICE.

MARSHAL T. REEVES AND JOHN N. KAILOR, OF COLUMBUS, INDIANA, ASSIGNORS TO REEVES & CO., OF SAME PLACE.

CLOVER-HULLER FEEDER.

SPECIFICATION forming part of Letters Patent No. 521,347, dated June 12, 1894.

Application filed October 2, 1893. Serial No. 487,001. (No model.)

*To all whom it may concern:*

Be it known that we, MARSHAL T. REEVES and JOHN N. KAILOR, citizens of the United States, residing at Columbus, in the county of Bartholomew and State of Indiana, have invented a new and useful Clover-Huller Feeder, of which the following is a specification.

Our invention relates to an improvement in clover-huller-feeders of that class in which the material is placed in the hopper arranged in the throat of the clover-huller machine, and a series of rake-bars arranged to draw the material toward the thrashing-cylinder while a series of push-bars or detainers are arranged to engage the upper part of the mass of material and force it away from the thrashing-cylinder.

We have shown and claimed the general arrangement and construction of such a feeder in another application filed simultaneously herewith.

The object of our present invention is, to provide improved means for operating the detaining-bars, and means for preventing the accumulation of material at the outer edges of the feeder.

The accompanying drawings illustrate our invention.

Figure 1, represents a side elevation of the feeder in working position, the hopper and a part of the hulling machine being shown in section. Fig. 2, represents a plan.

In the drawings, 2, indicates the frame of the feeder, which is adapted to be mounted on the top of the clover-huller above the thrashing-cylinder, 3. A hopper, 4, having an inclined bottom consisting of an endless-belt conveyer, 5, is mounted on the frame 2 so as to project into the throat of the huller leading to the thrashing-cylinder. Mounted also on frame 2, in suitable bearings, is a shaft, 6, provided with pulleys, 7, and, 8, and a multiple-crank-shaft, 9, carrying pulleys, 10, and, 11. Mounted upon shafts 6 and 9 are a series of rake-bars, 12, each of which is provided with a backwardly and downwardly inclined tooth, 13. Said rake-bars are pivoted, respectively, at their forward ends, to the cranks of shaft 9, and are supported at their ends by a slotted bearing, 14, which rests upon shaft 6. A rock-shaft, 15, provided at one end with an adjusting-lever, 16, is mounted on frame 2, and is provided with a pair of curved arms, 17, and, 18, which are rigidly secured, at one end, to the shaft. Each of said arms is forked at its free end and carries a friction roller, 19. A pair of push-bars, or, retaining-bars, 20, are mounted in the free ends of arms 17 and 18, so as to slide therein, each having a slotted bearing, 21, which engages the roller 19. Each of said detaining-bars is provided, at its forward end, with a tooth, 22, which projects downwardly from the bar at about a right angle therewith. The opposite ends of said detaining-bars are pivoted to adjacent rake-bars by means of a pivot, 23, attached to the side of the rake-bar and projecting through the detaining-bar, the arrangement being such that the rake-bar and the detaining-bar move backward and forward simultaneous but are oscillated vertically in opposite directions, the purpose being to cause the detaining-bars to engage and push backward, away from the thrashing cylinder, the upper part of the mass of the material, while the rake-bars are raised. For the purpose of preventing an accumulation of material between the sides of the hopper and the outermost rake-bars said bars are each provided with a laterally and backwardly projecting tooth, 24.

In operation, the clover being thrown into the hopper, it is moved toward the thrashing cylinder, within reach of the rakes, by the endless-belt conveyer 5. As it approaches the cylinder the mass is seized by the rakes successively and drawn toward the cylinder, and, during the upward and backward stroke of the rake-bars, the upper part of the mass is engaged by the teeth of the detainers and pushed backward. The mass of the material is thus, to a considerable extent, reduced to a substantially uniform thickness, and is spread evenly across the entire width of the throat leading to the thrashing cylinder.

We claim as our invention—

1. In a clover-huller-feeder, the combination of the main-frame, the hopper, the series of rake-bars mounted above said hopper, means for imparting a reciprocating, rocking movement to said rake-bars, and the series of detaining-bars mounted at one end upon a sliding bearing and pivoted at the other end to said rake-bars, all arranged to co-operate in the manner set forth.

2. In a clover-huller-feeder, the combination with the hopper, and the series of rake-bars arranged to traverse said hopper, of the laterally and backwardly projecting teeth 24 secured to the outer rake-bars, as and for the purpose set forth.

MARSHAL T. REEVES.
JOHN N. KAILOR.

Witnesses:
B. M. HUTCHINS,
HENRY D. YODER.